INVENTOR
ERHARDT KARIG
HERBERT KIRCHNER
BY Jennings Bailey, Jr.
ATTORNEY

United States Patent Office 3,426,624
Patented Feb. 11, 1969

3,426,624
TRANSMISSION, MOTOR AND BRAKE CONTROL
Erhardt Karig and Herbert Kirchner, Bad Homburg vor der Hohe, Germany, assignors, by mesne assignments, to Reimers-Getriebe K.G., Zug, Switzerland, a Swiss firm
Original application Mar. 12, 1965, Ser. No. 439,242, now Patent No. 3,368,426, dated Feb. 13, 1968. Divided and this application Aug. 14, 1967, Ser. No. 668,735
U.S. Cl. 74—846               5 Claims
Int. Cl. B60k 29/00; F02d 11/00

This is a divisional application of our application Ser. No. 439,242, filed Mar. 12, 1965, and now Patent No. 3,368,426.

The present invention relates to a control mechanism for a drive unit consisting of an engine which is combined with an infinitely variable transmission for driving and braking a machine, especially a vehicle.

Infinitely variable transmissions of mechanical or hydrostatic types which are connected to engines, especially of vehicles, are generally designed so as to attain the best possible coordination between the driving torque resulting from the fuel supply to the engine and the speed of the engine. This coordination is effected by a power control lever such as an accelerator, the movement of which to different positions determines the amount of the fuel supplied to the engine by means of a throttle valve, a fuel injection pump, or the like, and which is also connected to a governor, for example, a centrifugal governor or a hydraulic fuel control pump, or the like, which is influenced by the speed of the engine and adapted at a prevailing output of the engine to adjust the speed ratio of the infinitely variable transmission so as to be in accordance with the torque which is required at any particular time on the driven shaft of the transmission. The driver of the vehicle therefore only needs to adjust the engine output so as to be of the desired strength, while the adjustment of the speed of the vehicle in relation to the adjusted engine output is carried out by the infinitely variable transmission, the speed ratio of which is adjusted in accordance with the prevailing speed of the vehicle by means of the governor which is influenced by the engine speed.

When employing a drive unit of this type for a vehicle, there are considerable difficulties in decelerating the vehicle by means of the engine, that is, by means of the braking power of the engine resulting from its internal power losses when the power control lever, i.e. the accelerator, is released and the fuel or other energy supply is therefore substantially interrupted. In this position, the infinitely variable transmission is adjusted by the governor to a higher speed ratio so that the engine will then run at the lowest possible speed and will therefore have a low decelerating effect upon the moving vehicle since the braking power of a throttled engine increases in relation with its speed. In a vehicle which is provided with a shift-gear transmission, this may be avoided when driving down a steep grade by shifting the transmission to a lower gear in accordance with a high engine speed or by leaving the transmission in a higher gear or shifting it thereto when the grade is low and the desired deceleration by the engine should therefore also be low. During each of these shifting operations there is, however, always the danger that, since the transmission of power from the propelling driving wheels of the vehicle to the decelerating engine is then interrupted, the vehicle might accelerate excessively and might even get out of the driver's control completely.

It is therefore the object of the present invention to provide a control mechanism for a drive unit consisting of an engine and an infinitely variable transmission which permits the continuous adjustment of the engine speed by means of the infinitely variable transmission to be employed not only for accelerating and decelerating the speed of the vehicle on a level or ascending road, but also for attaining an equally sensitive and continuous variation and control of the decelerating or braking action of the engine when driving the vehicle downhill. The control mechanism according to the invention should therefore be capable, even when the driver decelerates the vehicle by means of the engine by substantially shutting off the fuel supply, to transmit to the governor the driver's command for a certain engine speed and thus also for the particular deceleration or braking effect as may then be desired so that this governor, in turn, will act upon the infinitely variable transmission and change the speed ratio thereof and will thereby attain the desired engine speed independently of the prevailing driving speed of the vehicle.

Another object of the invention is to attain the above mentioned results without requiring any additional control means which have to be actuated by the driver for giving the mentioned command other than those control means which are usually provided in a motor vehicle.

For attaining these objects the present invention originally relies upon a control mechanism of a conventional type for a drive unit consisting of a combination of an engine the speed of which depends upon the load thereon, with an infinitely variable transmission of any type which is suitable for driving as well as decelerating any machine, but especially a vehicle, by means of the same control elements which are usually provided for this purpose, and more particularly by means of at least one power control lever such as an accelerator, the movement of which to different positions determines the amount of fuel which is supplied to the engine, and which is also connected to a governor which is influenced by the speed of the engine and adapted to adjust the speed ratio of the infinitely variable transmission so as to be in accordance with the torque which is required at any particular time on the driven shaft of the transmission. On this basis, it is the principal feature of the present invention for attaining the above-mentioned objects to provide a control mechanism which, when the fuel supply to the engine is substantially shut off, may be operated by the driver by means of a control element which is adapted to regulate the braking power of the engine by solely acting upon the governor which is influenced by the engine speed and which by such an adjustment of this control element independently of the driving speed of the vehicle and thus independently of the speed of the driven shaft of the transmission permits the speed of the engine while driven by the vehicle, and thereby also the braking power of the engine, to be adjusted to any desired value. The invention therefore permits the power control lever, for example the accelerator of a car, to be shifted continuously without manipulation of any other control element from any particular driving position to any desired decelerating or braking position thereof without danger that any interruption in the power transmission may occur during the shifting operation.

The connection between the governor and the control motor for adjusting the transmission may be effected, for example, by a reversing switch in combination with a contractor, although this may also be accomplished by other transmitting means which may be, for example, of a hydraulic type.

Another feature of the invention consists in modifying the control mechanism by connecting the power control lever, on the one hand, to the governor which is controlled by the speed of the engine and, on the other hand, by means of an intermediate lever to the fuel control element which determines the amount of fuel which is supplied to the engine, and by providing further means which, by the additional actuation of the brake pedal for the wheel brakes of the vehicle, permit the support of the bearing of the intermediate lever to be acted upon in such a manner that the effect upon the fuel control element caused by the actuation of the power control lever will be partly or entirely eliminated. An additional feature of the invention which is of advantage particularly when applied to a vehicle, the engine of which is equipped with an automatic clutch, consists in providing the intermediate lever in the form of a balance beam and in pivotably mounting this lever on one end of another two-armed lever which is pivotable about a central axis and the other end of which rests on a clamp-shaped support which is connected to a piston which is slidable within a hydraulic cylinder, and is thus movable longitudinally, that is, in a direction substantially at a right angle to the direction of the two-armed lever when the latter is not pivoted from its normal position, and in controlling the position of this piston by the actuation of the brake pedal of the hydraulic wheel-brake mechanism.

This last-mentioned embodiment of the invention has the advantage that the adjustment of the power control lever and thus also of the governor for changing the speed ratio of the transmission while the vehicle is driven by the engine, that is, while it is supplied with fuel, and also the corresponding adjustment while the vehicle is decelerated by the engine and the fuel supply is shut off are both carried out in the same direction. When the brake pedal for the hydraulically controlled wheel brakes is then slightly depressed, the piston is lifted in the hydraulic cylinder which is connected to the hydraulic brake line. This has the result that the position of the clamp-shaped member on which one end of the intermediate two-armed lever is supported is shifted upwardly while the other end of this lever on which the balance beam is mounted drops down so that the fuel control element is closed and any subsequent forward movement of the power control lever only acts upon the governor of the transmission. The actual operation of the wheel brakes does not occur until the brake pedal is therefore further depressed. In this manner it is possible to effect the strongest possible braking action by the engine and also an application of the wheel brakes at the same time. Also this embodiment of the invention permits the engine brake to be associated with an exhaust brake. A very important advantage of this control mechanism also consists in the fact that, since the fuel control element is always closed before the wheel brakes can be applied, this mechanism is foolproof insofar as it is impossible for the driver to make any errors in its operation which might damage the engine or any other parts and which prior to this invention could occur if the power control lever, i.e. the accelerator, and the brake pedal were depressed at the same time. It is therefore now perfectly permissible that the driver rests both feet on the foot pedals of a car, that is, his right foot on the accelerator and the left foot on the brake pedal, since this cannot lead to any damage. On the contrary, this has the advantage that, since the driver saves the time which he would otherwise need for shifting his right foot from the accelerator to the brake pedal, he can apply the wheel brakes more quickly and can thus also reduce the stopping distance of the vehicle considerably which, in turn, means that a vehicle which is equipped with such a control mechanism has a higher road safety than other vehicles with conventional control means. If, however, a driver does not wish to apply the engine brake, he may also operate this control mechanism without any disadvantages in the conventional manner by actuating the accelerator and brake pedal successively with the same foot.

A control mechanism of this design has the further advantage that it enables the driver to operate the car contrary to the normal association between the speed and torque as determined by the power control lever by employing his right foot for controlling the speed ratio of the transmission and his left foot for controlling the engine output. This is of particular importance in passing maneuvers when the driven shaft must have a high moment of acceleration. By depressing his right foot, the driver may race the engine before the passing maneuver, while holding the fuel control element nearly closed with his left foot by stepping lightly on the brake pedal. As soon as the passing maneuver may be safely carried out, the driver only needs to remove his left foot from the brake pedal and will then have the full engine power available for accelerating the vehicle.

Another advantageous feature of the invention consists in supporting the mentioned balance beam by means of a bracing lever which is pivotable to a limited extent, and in connecting this bracing lever by connecting rods and a one-way coupling to the brake pedal for the operation of the wheel brakes.

Such a mechanism permits the balance beam which forms the connection between the power control lever and the fuel control element to be deprived of its central support and this support to be adjusted continuously up to an end position in which an actuation of the power control lever will only result in an adjustment of the governor for changing the speed ratio of the transmission, but not in an actuation of the fuel control element which might further increase the output of the engine. The fuel control element therefore remains closed when the bracing lever on which the balance beam is supported is moved to this end position. If the brake pedal is further depressed, the piston of the hydraulic brake will then also be depressed so as to start the application of the wheel brakes. This further movement of the brake pedal for carrying out its conventional function does not interfere with mentioned bracing lever which is then stopped in its end position because of the provision of the one-way coupling between the brake pedal and this bracing lever which takes up the further movement of the connecting rod between the brake pedal and this coupling. This control mechanism also permits the engine brake and the wheel brake to be applied either separately or together. Of course, also in this case it is possible to employ the engine brake selectively in association with an exhaust brake.

The numerous features and advantages of the present invention will become more clearly apparent from the following detailed description thereof which is to be read with reference to the accompanying drawings, in which:

FIGURE 2 shows the control mechanism according to FIGURE 1 in the braking position; while

Figure 1:
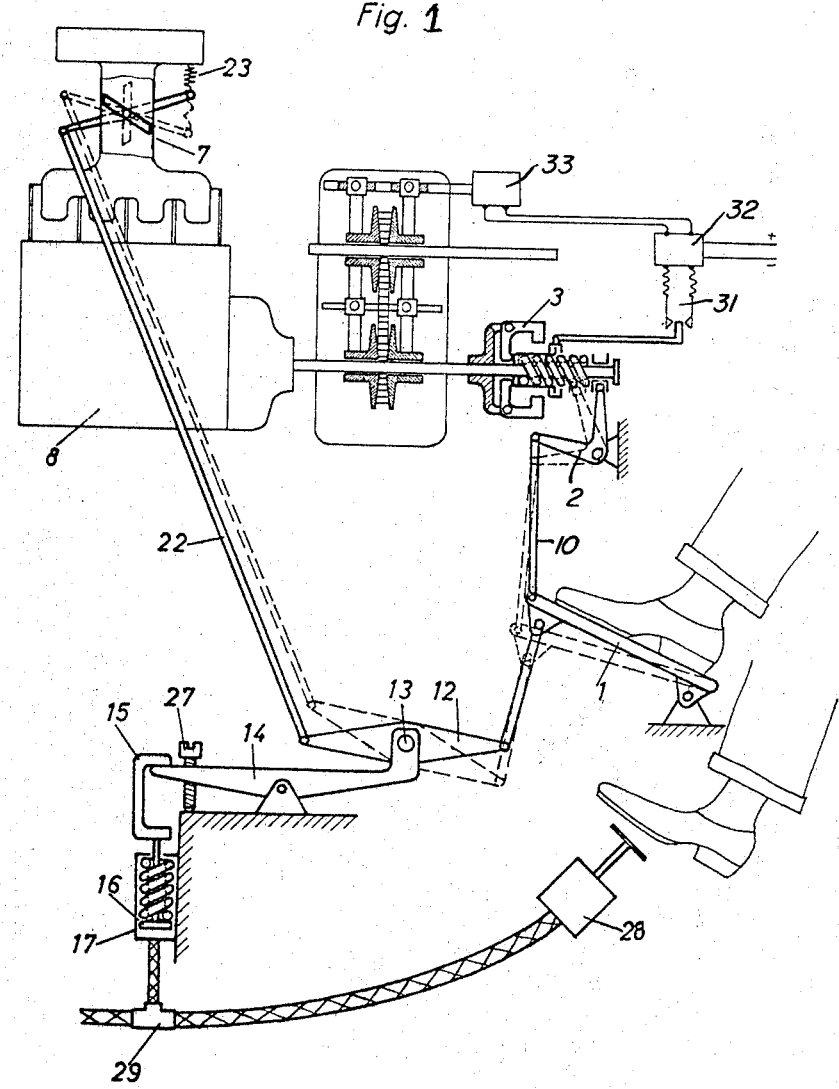
FIGURE 1 shows a diagrammatic illustration of a control mechanism according to the invention in the neutral position together with an engine, an infinitely variable transmission, and a brake pedal, and with the power control lever acting upon a balance beam.

According to the invention, as illustrated in FIGURE 1, the power control pedal 1 or accelerator of a motor vehicle which is shown in FIGURE 1 in its neutral position is connected by means of a bell crank 2 and a transmitting lever 10 to a centrifugal governor 3 for adjusting it to different operating positions. The governor 3, in turn, is adapted to vary the speed ratio of an infinitely variable transmission 4 by means of a reversing switch 31, a contactor 32, and a control motor 33. When pedal 1 is pivoted forwardly, this movement is transmitted by the bell crank 2 and the transmitting lever 10 to the centrifugal governor 3 so that the balanced speed of the latter is increased and the governor, in turn, for example, by electrical means, such as the reversing switch 31, the contactor 32, and the control motor 33, changes the speed ratio of the infinitely variable transmission 4 so that the driven shaft of the latter will run at a lower speed and with a high torque.

Figure 2:
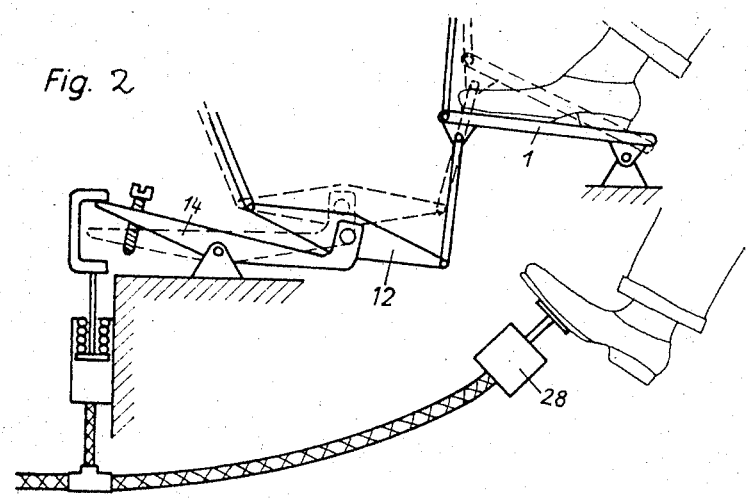

The movement of the power control pedal 1, which extends only in the forward direction from its neutral position, is transmitted to the fuel control element 7 urged to close position by spring 23 by means of a rod 22 pivoted to a balance beam 12 which is pivotably mounted on a pin 13 on one end of an intermediate lever 14. The other end of this lever 14 acts upon a clamp-shaped member 15 which is connected to a piston 16 which is movable longitudinally within a hydraulic cylinder 17. The neutral position of the control mechanism may be adjusted by means of a setscrew 27 on the intermediate lever 14. When the power control pedal 1 is actuated, the usual result occurs that the throttle valve 7 is opened and the balanced speed of the centrifugal governor 3 is also increased. However, when the brake pedal of a hydraulic brake mechanism 28 is then also actuated, the pressure is transmitted through a T-shaped connecting piece 29 to the hydraulic cylinder 17 in which the piston 16 is thereby lifted so that the intermediate lever 14 is deprived at one side of its support. When the power control pedal 1 is then depressed, as illustrated in FIGURE 2, the fuel control element 7 will no longer be actuated, but only the balanced speed of the centrifugal governor 3 will be varied. If the brake pedal of the hydraulic brake mechanism 28 is further depressed, the wheel brakes of the vehicle will be actuated in the usual manner. If the driver of the vehicle should step hard on both foot pedals at the same time, that is, on the power control pedal 1 and the pedal of the hydraulic brake mechanism 28, which ordinarily he might do only under the influence of shock, no dangerous results will occur since the fuel control element 7 is closed and the driving force of the engine is reduced to the idling power. On the contrary, the brake action of the hydraulic wheel brakes which is then normally to be expected will be increased by the additional braking force of the engine 8.

Figure 3:
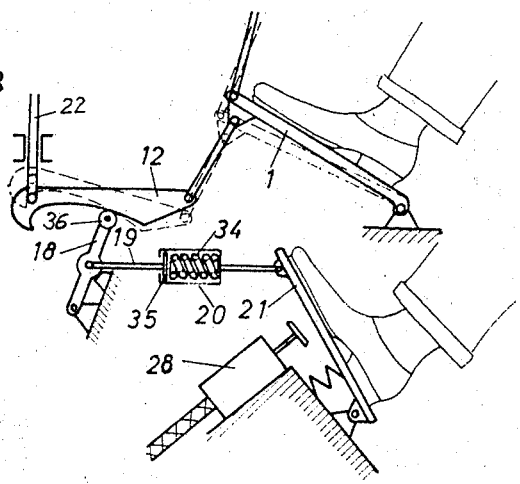
FIGURES 3 and 4 show diagrammatic illustrations of a further modification of the control mechanism in the neutral position and the braking position, respectively.
Figure 4:
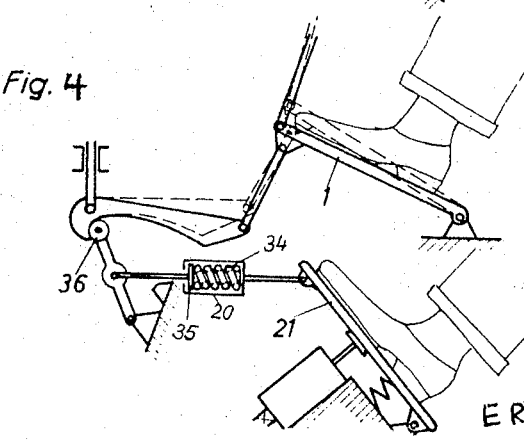

FIGURE 3 illustrates substantially the same control mechanism as shown in FIGURES 1 and 2, except that in this case the balance beam 12 is provided on its lower side with a cam surface and is normally centrally supported on a roller 36 which is mounted on a bracing lever 18. In normal driving, the operation of the power control pedal 1 will therefore open or close the throttle valve 7 and also actuate the centrifugal governor 3. If, however, the brake pedal 21 is also initially depressed, the bracing lever 18 will be pivoted forwardly toward its end position so that, even though the power control pedal 1 remains in the same position, the throttle valve 7 will be more or less closed. When the brake pedal 21 is so far depressed that the bracing lever 18 is in its most forward position, as shown in FIGURE 8, in which its roller 36 engages against a stop, the throttle valve 7 can no longer be actuated even though the power control pedal 1 is fully depressed. The throttle valve 7 therefore remains closed, while the speed of the centrifugal governor 3 is increased to its maximum valve. In order to permit the brake pedal 21 to be further depressed so as to apply the wheel brakes of the vehicle, a one-way coupling 20, 34, 35 is interposed in the connecting rod 19 between the brake pedal 21 and the bracing lever 18.

Having thus fully disclosed our invention, what we claim is:

1. In combination with a drive unit of a vhicle comprising an engine, an infinitely variable transmission connected to said engine for driving, decelerating, and braking said vehicle, a fuel control element, and a governor influenced by the speed of said engine for controlling and varying the speed ratio of said transmission, a control mechanism for said drive unit comprising a first control member, means for connecting said first control member to said governor for adjusting the same, and means for also connecting said first control member to said fuel control element for opening and substantially closing the same for adjusting the amount of fuel to be supplied to said engine, said last means comprising an intermediate member connected at one end to said first control member and at the other end to said fuel control element, supporting means for said intermediate member, wheel-brake means for said vehicle, and a second driver-actuated control member for operating said wheel-brake means and for also moving said supporting means so that said fuel control element after being opened by said first control member will be moved toward its closed position independently of the movement of said first control member for further adjusting said governor for regulating the braking action of said engine while said engine is being driven by said vehicle.

2. In the combination as defined in claim 1, in which said second control member is adapted first to move said supporting means for a certain distance before acting upon said wheel-brake means.

3. In the combination as defined in claim 1, in which said second control member is adapated first to move said supporting means to substantially close said fuel control element before acting upon said wheel-brake means.

4. In combination with a drive unit of a vehicle comprising an engine, an infinitely variable transmission connected to said engine for driving, decelerating, and braking said vehicle, a fuel control element, and a governor influenced by the speed of said engine for controlling and varying the speed ratio of said transmission, a control mechanism for said drive unit comprising a first control member, means for connecting said first control member to said governor for adjusting the same, and means for also connecting said first control member to said fuel control element for opening and substantially closing the same for adjusting the amount of fuel to be supplied to said engine, said last means comprising a balance beam connected at one end to said first control member and at the other end to said fuel control element, a two-armed supporting lever pivotable about a central axis, said balance beam being pivotably mounted on one end of said supporting lever, wheel-brake means for said vehicle comprising a hydraulic pressure line, said second control member comprising a cylinder connected to said hydraulic line, and a piston slidable in said cylinder, a second driver-actuated control member consisting of a brake pedal for moving said piston in said cylinder, a second cylinder connected to said hydraulic line and a piston slidable in said second cylinder, and means connected to said last piston for normally holding the other end of said supporting lever in a neutral position in which said first control member may open and substantially close said fuel control element and for releasing said other end when said brake pedal is depressed and for thereby substantially closing said fuel control element independently of the movement of said first control member for further adjusting said governor for regulating the braking action of said engine while said engine is being driven by said vehicle.

5. In combination with a drive unit of a vehicle comprising an engine, an infinitely variable transmission connected to said engine for driving, decelerating, and braking said vehicle, a fuel control element, and a governor influenced by the speed of said engine for controlling and varying the speed ratio of said transmission, a control mechanism for said drive unit comprising a first control member, means for connecting said first control member to said governor for adjusting the same, and means for also connecting said first control member to said fuel control element for opening and substantially closing the same for adjusting the amount of fuel to be supplied to said engine, said last means comprising a balance beam connected at one end to said first control member and at the other end to said fuel control element, a bracing member normally engaging with one end upon a substantially central point of said balance beam to support the same while said fuel control element is adjusted by said first control member, wheel-brake means for said vehicle, a second driver-actuated control member consisting of a brake pedal for operating said wheel-brake means, connecting means connecting said brake pedal to said bracing lever for pivoting the same from said central point toward a stop near the end of said balance beam to which said fuel control element is connected when said brake pedal is depressed, whereby said fuel control element is moved toward its closed position, said connecting means comprising a one-way coupling permitting said brake pedal to be further depressed for actuating said wheel-brake means when said bracing lever engages upon said stop and said fuel control element is substantially closed and said first control member then only acts upon said governor to control the braking action of said engine while said engine is being driven by said vehicle, said coupling adapted to retract said bracing lever to said central point when said brake pedal is released.

References Cited

UNITED STATES PATENTS

| | | | |
|---|---|---|---|
| 2,640,372 | 6/1953 | Dodge | 74—846 |
| 2,927,475 | 3/1960 | Burckhardt | 74—846 |
| 3,035,459 | 5/1962 | Legros | 74—846 |
| 3,202,012 | 8/1965 | Jania | 74—846 |

BENJAMIN W. WYCHE III, *Primary Examiner.*

U.S. Cl. X.R.

192—4, 3